United States Patent
Burnic et al.

(10) Patent No.: US 10,122,522 B2
(45) Date of Patent: Nov. 6, 2018

(54) METHODS AND DEVICES FOR SYNCHRONIZING DATA RECEPTION FROM A FIRST RADIO NETWORK AND FROM A SECOND RADIO NETWORK

(71) Applicant: Intel IP Corporation, Santa Clara, CA (US)

(72) Inventors: Admir Burnic, Duisburg (DE); Frank Huertgen, Krefeld (DE)

(73) Assignee: Intel IP Corporation, Santa Clara, CA (US)

( * ) Notice: Subject to any disclaimer, the term of this patent is extended or adjusted under 35 U.S.C. 154(b) by 22 days.

(21) Appl. No.: 15/042,252

(22) Filed: Feb. 12, 2016

(65) Prior Publication Data

US 2016/0277174 A1 Sep. 22, 2016

(30) Foreign Application Priority Data

Mar. 20, 2015 (DE) .......................... 10 2015 104 186

(51) Int. Cl.

| | | |
|---|---|---|
| *H04W 88/06* | (2009.01) | |
| *H04L 7/00* | (2006.01) | |
| *H04B 1/3816* | (2015.01) | |
| *H04W 56/00* | (2009.01) | |

(52) U.S. Cl.
CPC ......... *H04L 7/0008* (2013.01); *H04B 1/3816* (2013.01); *H04W 56/0035* (2013.01); *H04W 56/001* (2013.01); *H04W 88/06* (2013.01)

(58) Field of Classification Search
CPC ........ H04B 1/3816; H04B 7/06; H04B 7/216; H04B 17/00; H04J 3/06; H04L 5/00; H04L 7/00; H04L 7/008; H04M 1/00; H04W 52/02; H04W 56/00; H04W 56/0035; H04W 72/00; H04W 72/04; H04W 88/02; H04W 88/04; H04W 88/08
USPC ................ 370/328, 329, 342, 350; 375/356; 455/67.16, 423, 509, 558, 574
See application file for complete search history.

(56) References Cited

U.S. PATENT DOCUMENTS

| | | | |
|---|---|---|---|
| 8,780,791 B2 | 7/2014 | Hou | |
| 2009/0245228 A1* | 10/2009 | Osterling | H04J 3/0638 370/350 |
| 2010/0067507 A1* | 3/2010 | Park | H04J 3/0638 370/338 |
| 2011/0195749 A1* | 8/2011 | Lan | H04W 8/183 455/558 |
| 2012/0087402 A1* | 4/2012 | Patoine | H04J 3/0697 375/226 |

(Continued)

OTHER PUBLICATIONS

English translation of Office Action dated Mar. 11, 2016 for German Patent Application No. 102015104186.3.

*Primary Examiner* — Shawkat M Ali
(74) *Attorney, Agent, or Firm* — Schiff Hardin LLP (57) ABSTRACT

A synchronization device includes a receiver circuit configured to receive data from a first radio network during a first time interval and to receive data from a second radio network during a second time interval; a frequency synchronization circuit configured to control a common system clock based on first data received from the first radio network and based on second data received from the second radio network; and a timing synchronization circuit configured to time-synchronize data reception based on the common system clock and based on a free running clock.

14 Claims, 9 Drawing Sheets

(56) References Cited

U.S. PATENT DOCUMENTS

| | | | |
|---|---|---|---|
| 2012/0108294 A1* | 5/2012 | Kaul | G06K 7/0013 455/558 |
| 2012/0140709 A1* | 6/2012 | Hou | H04W 56/0015 370/328 |
| 2012/0328061 A1* | 12/2012 | Chow | H04W 56/0015 375/354 |
| 2013/0286959 A1* | 10/2013 | Lou | H04W 72/04 370/329 |
| 2014/0036903 A1* | 2/2014 | Ryan | H04W 56/00 370/350 |
| 2014/0045489 A1 | 2/2014 | Josso | |

* cited by examiner

METHODS AND DEVICES FOR SYNCHRONIZING DATA RECEPTION FROM A FIRST RADIO NETWORK AND FROM A SECOND RADIO NETWORK

FIELD

The disclosure relates to methods and devices for synchronizing data reception from a first radio network and from a second radio network, in particular synchronizing data reception with respect to multi-SIM applications.

BACKGROUND

For correct operation of wireless communication devices, e.g. user equipment (UE) for mobile communications, for example UMTS (Universal Mobile Telecommunications System), a precise synchronization of the mobile terminals (MT) to the network infrastructure (e.g. base station (BS)) is necessary, in particular when the UE includes a dual-SIM (Subscriber Identity Module) or multi-SIM UE allowing access to more than one radio network. This synchronization includes accurate frequency and timing acquisition and tracking of the base station(s). Both frequency and timing is impacted by the system clock (SC) rate of the mobile terminal and of the base station(s). A difference between the mobile terminal rate and the base station(s) rate of the system clock may result in a frequency offset and in different sampling rates. The first one may produce a frequency domain shift of the received signal, the second one a time domain drift between the timers implemented in the base station(s) and in the mobile terminal.

Methods and devices employed in wireless communication networks constantly have to be improved. In particular, it may be desirable to improve the synchronization performance of the mobile receiver in situations as described above.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be based on frequency and timing synchronization. Frequency synchronization is the process of establishing consistency among frequency from a source, e.g. a base station to frequency of a target, e.g. a user equipment and vice versa. Timing synchronization is the process of establishing consistency among a clock from a source, e.g. a base station to a clock of a target, e.g. a user equipment and vice versa. The methods and devices described herein may include SIM modules and/or multi-SIM modules. A subscriber identity module or subscriber identification module (SIM) is an integrated circuit that may securely store the international mobile subscriber identity (IMSI) and the related key used to identify and authenticate subscribers on mobile telephony devices, for example mobile phones and computers. A dual SIM mobile phone is a mobile phone which may hold two SIM cards. Devices that use more than two SIM cards, also referred to as Multi-SIM devices have also been developed and released. Dual standby phones allow both SIMs to be accessed through time multiplexing. When making or receiving calls, the modem locks to the active channel; the other channel may be ignored and thus may be unavailable during the duration of the call. Dual SIM active phones or dual active phones, however, may come with two transceivers, and may be capable of receiving calls on both SIM cards, at the cost of increased battery consumption. Dual SIM phones have become popular especially with business users due to reduced costs by being able to use two different networks based on signal strength or cost, as well as negating the need for having two or more separate devices.

The methods and devices described herein may be implemented in wireless communication networks, in particular communication networks based on UMTS (Universal Mobile Telecommunications System) and 3GPP (3$^{rd}$ Generation Partnership Project) systems. The methods and devices described below may further be implemented in a mobile device (or mobile station or User Equipment (UE)) or a base station (NodeB, eNodeB). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to about 300 GHz. The frequency range may correspond to frequencies of alternating current electrical signals used to produce and detect radio waves.

Figure 1:
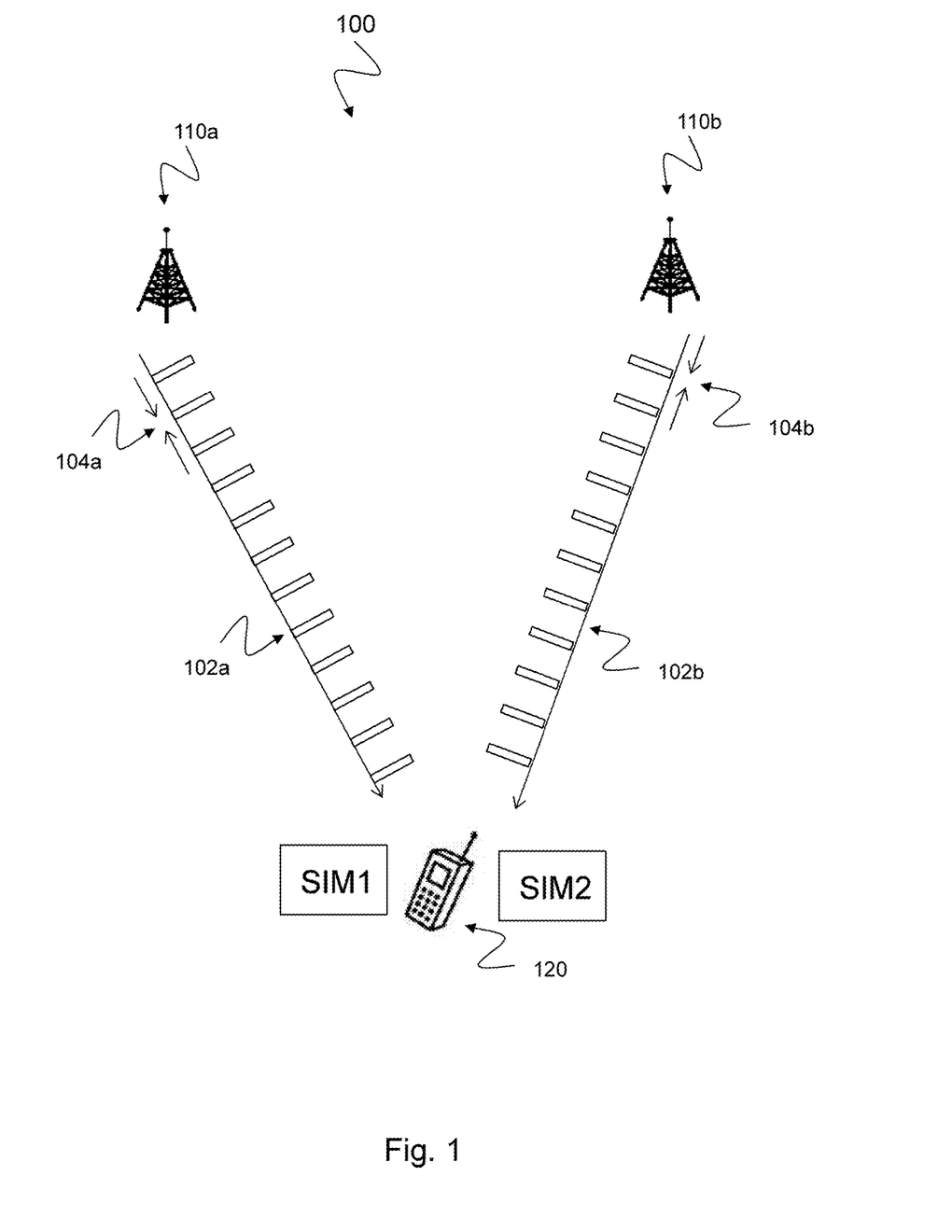
FIG. 1 is a schematic diagram of a radio communication network 100 including a dual-SIM mobile terminal 120 and two base stations 110a, 110b.

FIG. 1 is a schematic diagram of a radio communication network 100 including a dual-SIM mobile terminal 120 and two base stations 110a, 110b. In radio communication between a dual SIM UE 120 and a first base station 110a of a first radio network and a second base station 110b of a second radio network, a first transmit signal 102a is received by the dual SIM UE 120 during first time intervals 104a and a second transmit signal 102b is received by the dual SIM UE 120 during second time intervals 104b. The dual SIM UE 120 may include a first SIM (SIM1) for communicating with the first radio network and a second SIM (SIM2) for communicating with the second radio network. The dual SIM UE 120 may be configured to switch communication between the first radio network and the second radio network in a TDMA (Time Division Multiple Access) manner. Synchronization between the two radio networks may be performed as described in the following.

The system clock may be generated by electrical circuits that may include a reference crystal oscillator (XO). This XO may be used to drive the circuits which may be used for the conversion of the signals received on a carrier frequency to the signals at the low intermediate frequency or in the baseband (down-mixing). The quality of these signals may have a direct impact on the sensitivity of the receiver. The system clock may be further used to drive the electrical circuits which may be used for the conversion of the signals from analog into digital domain (AD conversion) and from digital into analog domain (DA conversion). The mobile terminal's system clock may be adapted to the networks system clock, e.g. by measuring the signals 102a, 102b transmitted by the involved base stations 110a, 110b. This may be implemented by a closed control loop on the mobile terminal. This control is further addressed as automatic frequency correction (AFC) loop.

A first new feature for UMTS phones is dual-SIM-dual-standby (DSDS). It means the mobile terminal may include two SIM cards and may register in two networks. If the mobile terminal is in idle/stand-by it may be able to receive paging, i.e. notifications of incoming calls, from both networks. The MT may tune to each of the networks at their respective possible paging instances. The point of time in which a paging can occur may be known by the MT. For cost reasons the MT may have only one receiver chain and may operate in these two networks in time division multiple access (TDMA) manner.

An even more challenging feature for a Dual-SIM phone is to receive a paging on one network during an active connection (i.e. call) on the second network. We refer to this feature as Dual-SIM-Single-Transport (DSST). An application may be for example the notification of an incoming call on first network (NW1), while being in a call on second network (NW2). Thus, the paging sequence may be received on one network, while having parallel activity on the other network. For both, DSDS feature and DSST feature, the mobile terminal may need to operate in two networks in a TDMA manner. For both features, synchronization as described in the following may be necessary if the two involved base stations 110a, 110b belonging to the two SIMs (SIM1, SIM2) are having non-synchronized system clocks as shown in FIG. 2.

Figure 2:
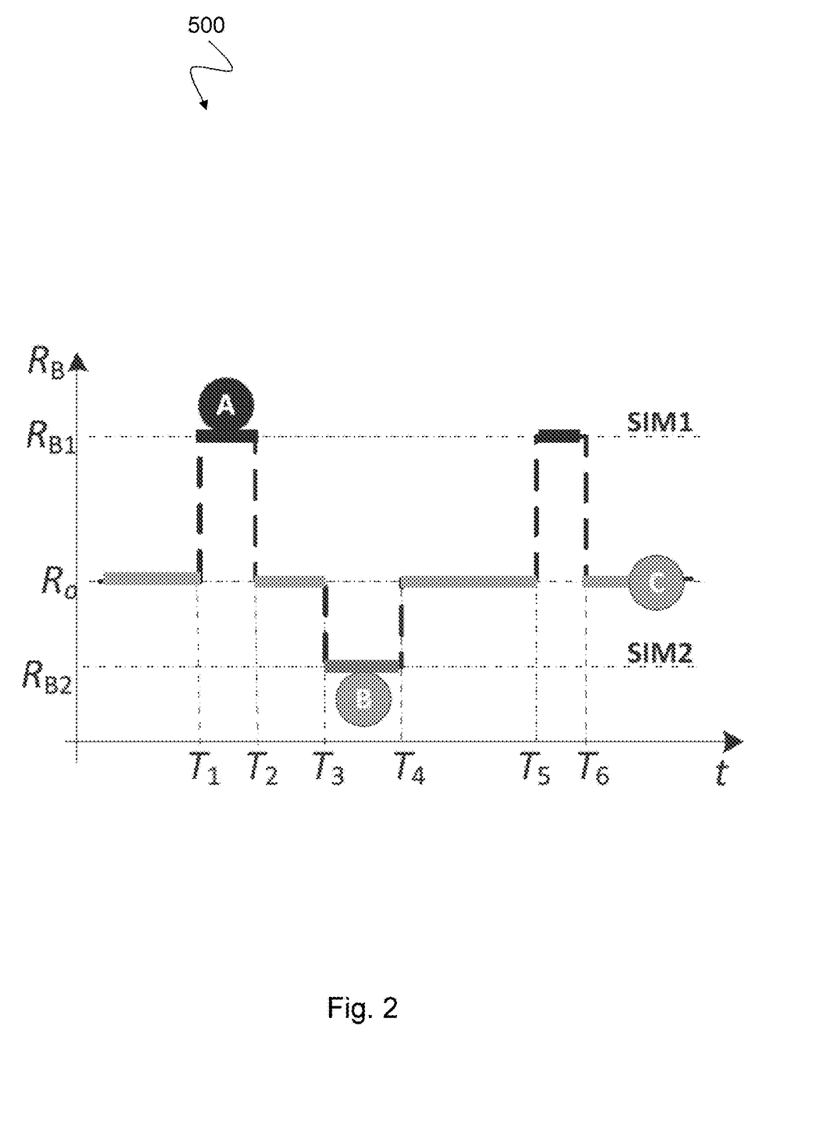
FIG. 2 is a timing diagram 200 of a system clock in accordance with the disclosure.

FIG. 2 is a timing diagram 200 of a system clock in accordance with the disclosure. The values $T_1$, $T_2$, $T_3$, $T_4$, $T_5$, $T_6$ at the abscissa are representing time t, while the vales $R_{B1}$, $R_0$, $B_{B2}$ at the ordinate are representing the system clock rate $R_B$ that the mobile terminal may use. The values $R_{B1}$ and $B_{B2}$ are the rates of the system clock of first base station BS1, e.g. 110a of FIG. 1 and of second base station BS2, e.g. 110b of FIG. 1 respectively observed by the mobile terminal, e.g. MT 120 of FIG. 1. The BS1 may be associated to the SIM1 and the BS2 may be associated to the SIM2, or vice versa. During the time interval "A", $T_1 > t \geq T_2$ and $T_5 > t \geq T_6$, the MT may receive the signal, e.g. signal 102a of FIG. 1 from BS1 110a, during the time interval "B", $T_3 > t \geq T_4$, the MT may receive the signal, e.g. signal 102b of FIG. 1 from BS2 110b. During the time interval "C" it may receive no signals from none of the base stations 110a, 110b. If MT synchronizes its SC to the SC of the BS1 (C1) an offset to the SC of the BS2 $\Delta R_B = R_{B1} - R_{B2}$ may be introduced, or vice versa. If $\Delta R_B$ is high and no other measures are taken a degrading demodulation performance due to the frequency offset in the received signal and due to the offset in the sampling rate may be observed. Furthermore a timing drift of the signals received from BS2 may be introduced. If no appropriate measures are taken even loss of the synchronization to BS2 may occur.

Applying methods and devices according to the disclosure solves the problem to provide sufficient synchronization to both BS1 and to BS2 as described in the following.

Figure 3:
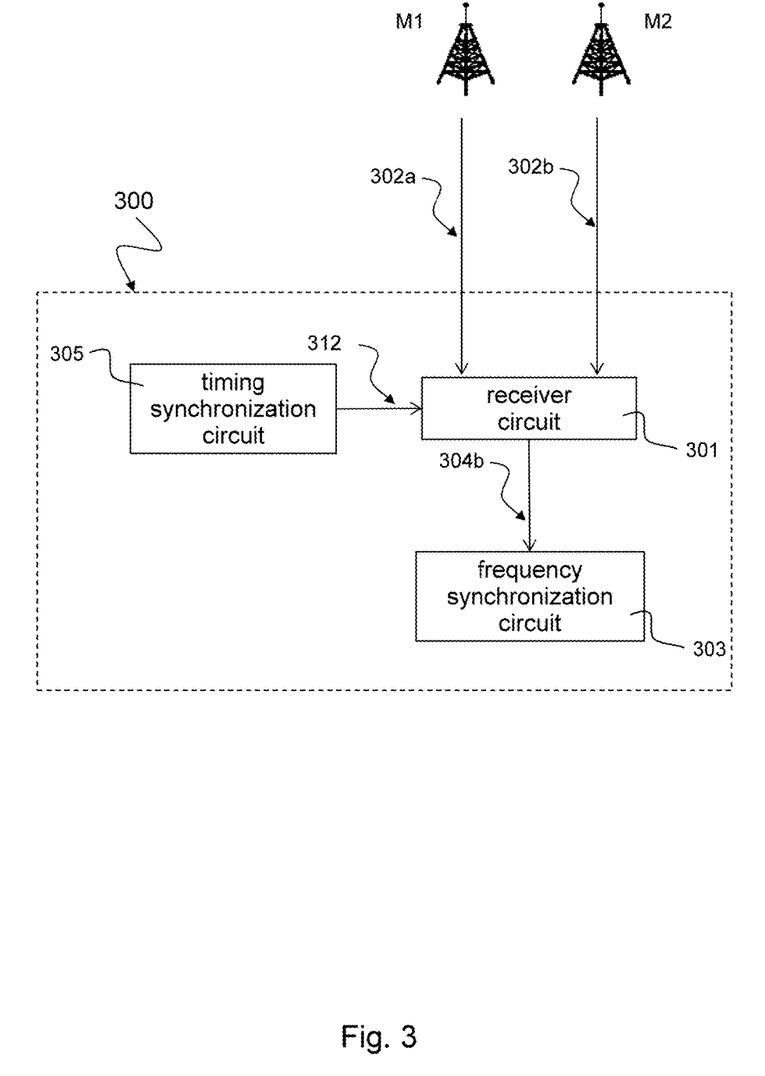
FIG. 3 is a schematic diagram of a synchronization device 300 in accordance with the disclosure.

FIG. 3 is a schematic diagram of a synchronization device 300 in accordance with the disclosure. The synchronization device 300 includes a receiver circuit 301, a frequency synchronization circuit 303 and a timing synchronization circuit 305. The receiver circuit 301 is configured to receive data from a first radio network M1 during a first time interval 202a and to receive data from a second radio network M2 during a second time interval 202b. The frequency synchronization circuit 303 is configured to control a common system clock, e.g. denoted as $SC_F$ in the following, based on (first) data received from the first radio network M1 and based on (second) data received from the second radio network M2. The timing synchronization circuit 305 is configured to time-synchronize data reception based on the common system clock $SC_F$ and based on a free running clock, e.g. denoted as M0 in the following.

The timing synchronization circuit 305 may be configured to time-synchronize data reception from the first radio network M1 based on the common system clock $SC_F$ during the first time interval and based on the free running clock M0 during times not coinciding with the first time interval, i.e. times separate from the first time interval and to time-synchronize data reception from the second radio network M2 based on the common system clock $SC_F$ during the second time interval and based on the free running clock M0 during times not coinciding with the second time interval, i.e. times separate from the second time interval.

The synchronization device 300 and further devices and methods according to the disclosure are based on the concept of decompiling of the frequency synchronization and of the timing synchronization as described in the following.

SIM specific AFC loops may be implemented for control of the common system clock. The system clock may be used in the TDMA manner based on the RF access. This approach provides accurate frequency correction and accurate sampling rates for both SIMs.

A free running clock may be applied which may be used to support the timing acquisition and maintenance. The free running clock may be used for the SIM specific activity scheduling. The SIM specific system clock may be used to increase timing accuracy. For that purpose dedicated measurements during RF activity phases may be used to measure the rate offset between the SIM independent free running clock and the SIM specific clock. Since the timing calculation may be based on the free running clock an accurate SIM specific timing calculation can be performed as described in the following with respect to FIGS. 4 to 8.

Figure 4:
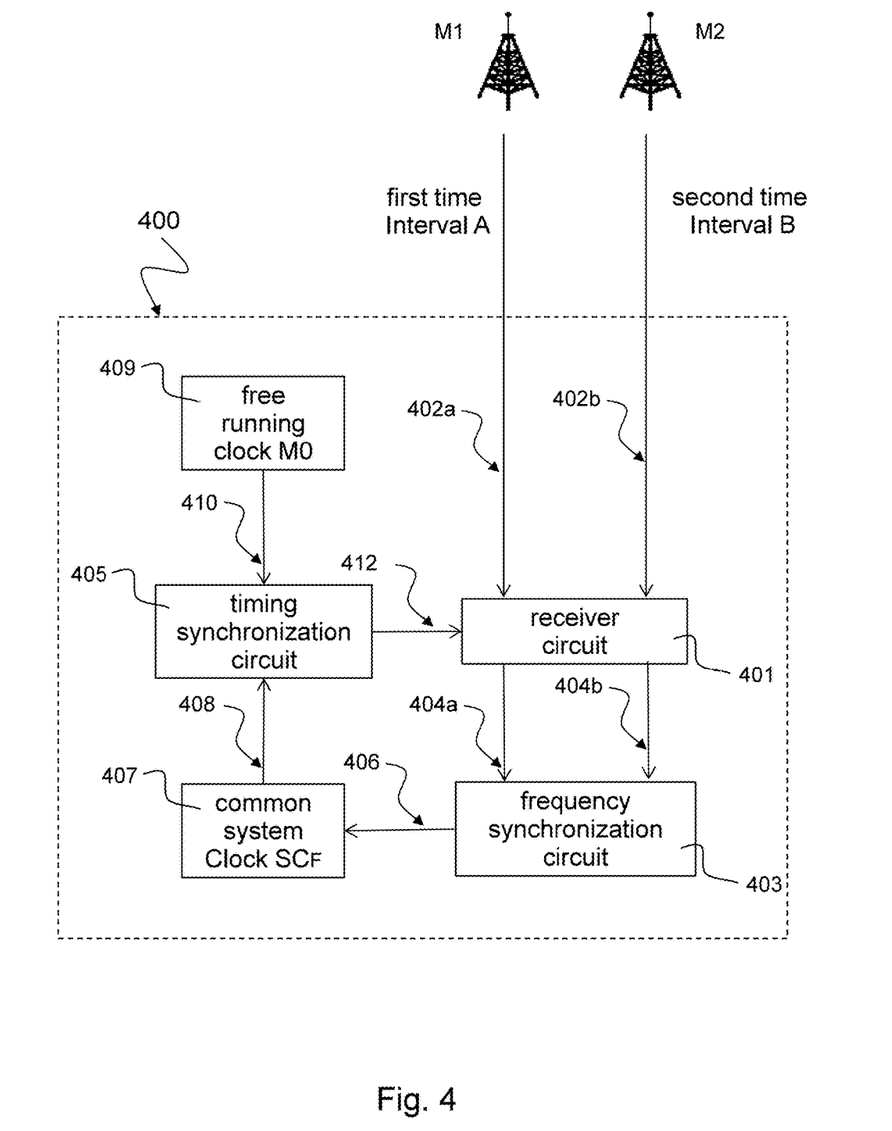
FIG. 4 is a schematic diagram of a synchronization device 400 in accordance with the disclosure.

FIG. 4 is a schematic diagram of a synchronization device 400 in accordance with the disclosure. The synchronization device 400 may include a receiver circuit 401, a frequency synchronization circuit 403, a timing synchronization circuit 405, a common system clock $SC_F$ 407 and a free running clock M0 409. The receiver circuit 401 may be configured to receive data 402a from a first radio network M1 during a first time interval A and to receive data 402b from a second radio network M2 during a second time interval B. The frequency synchronization circuit 403 may be configured to control a common system clock $SC_F$ based on data 402a received from the first radio network M1 and based on data 402b received from the second radio network M2. The timing synchronization circuit 405 may be configured to time-synchronize data reception 402a, 402b based on the common system clock $SC_F$ and based on a free running clock M0.

The timing synchronization circuit 405 may be configured to time-synchronize data reception 402a from the first radio network based on the common system clock during the first time interval and based on the free running clock during times not coinciding with the first time interval, i.e. times separate from the first time interval. The timing synchronization circuit 405 may be configured to time-synchronize data reception 402b from the second radio network based on the common system clock during the second time interval and based on the free running clock during times not coinciding with the second time interval, i.e. times separate from the second time interval.

The frequency synchronization circuit may be configured to control the common system clock $SC_F$ during the first time interval A based on (first) data received from the first radio network M1 and to control the common system clock $SC_F$ during the second time interval B based on (second) data received from the second radio network M2. The frequency synchronization circuit 403 may be configured to tune the common system clock $SC_F$ to a remote system clock of the first radio network M1 during the first time interval A and to tune the common system clock $SC_F$ to a remote system clock of the second radio network M2 during the second time interval B.

The synchronization device 400 may include a first controller, e.g. a first controller 604 as described below with respect to FIG. 6, to determine a first clock rate $R_{M1}$ associated with the remote system clock of the first radio network M1 based on data 402a received during the first time interval A. The synchronization device 400 may include a second controller, e.g. a second controller 607 as described below with respect to FIG. 6, to determine a second clock rate $R_{M2}$ associated with the remote system clock of the second radio network M2 based on data 402b received during the second time interval B.

The synchronization device 400 may include a first switch, e.g. a first switch 621 as described below with respect to FIG. 6, configured to switch the received data to the first controller during the first time interval A and to switch the received data to the second controller during the second time interval B. The first controller may be coupled to the free running clock M0 and may be configured to determine the first clock rate $R_{M1}$ based on the free running clock M0 during times not coinciding with the first time interval A, e.g. as described below with respect to FIG. 6. The second controller may be coupled to the free running clock M0 and may be configured to determine the second clock rate $R_{M2}$ based on the free running clock M0 during times not coinciding with the second time interval B, e.g. as described below with respect to FIG. 6.

The synchronization device 400 may include a reference circuit, e.g. a reference circuit 623 as described below with respect to FIG. 6, configured to adjust the common system clock $SC_F$ based on the first clock rate $R_{M1}$ during the first time interval A and based on the second clock rate $R_{M2}$ during the second time interval B. The reference circuit may include a second switch, e.g. a second switch 625 as described below with respect to FIG. 6, configured to switch the adjusted common system clock SCF to a reference clock RF input of the receiver circuit 401, e.g. a reference clock input 632 as described below with respect to FIG. 6. The reference circuit may be configured to switch-off the common system clock $SC_F$ during times not coinciding with either one of the first time interval A and the second time interval B.

Figure 5:
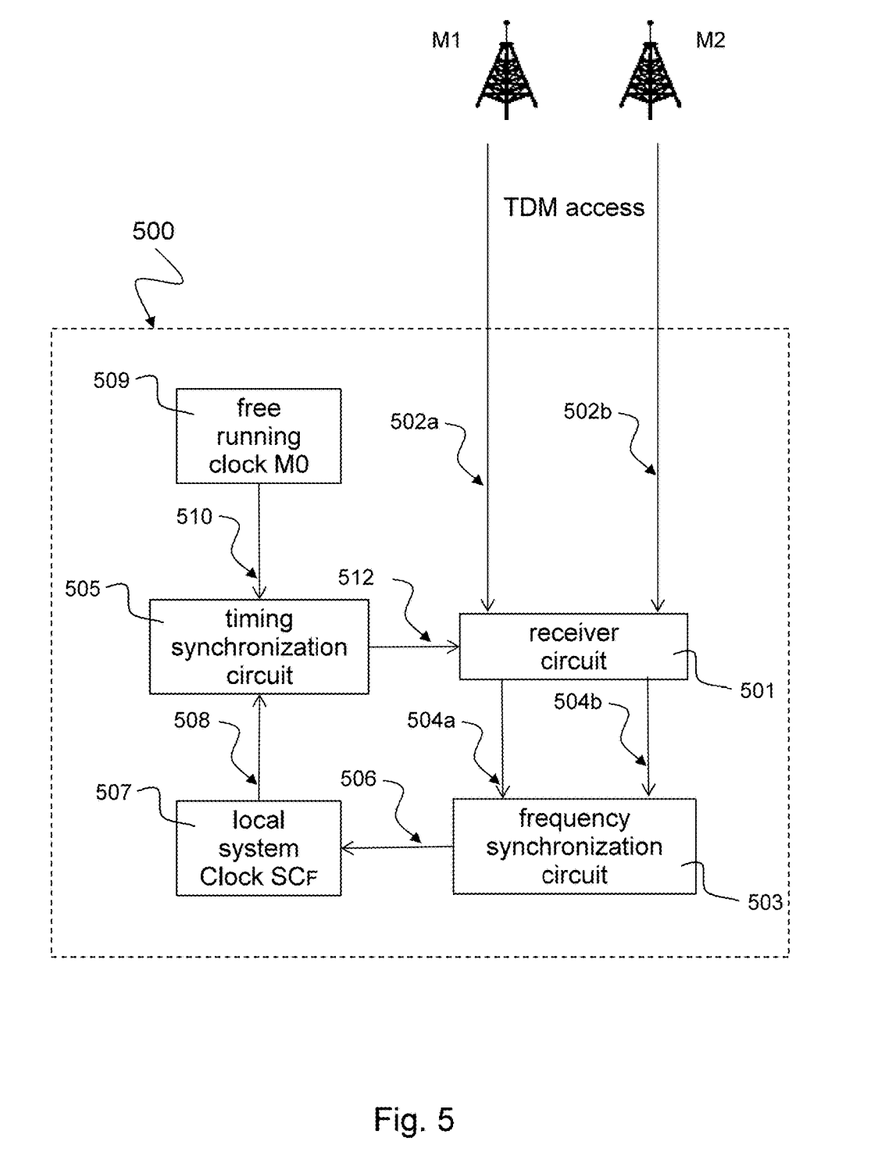
FIG. 5 is a schematic diagram of a synchronization device 500 in accordance with the disclosure.

FIG. 5 is a schematic diagram of a synchronization device 500 for use in a multi-SIM mobile receiver in accordance with the disclosure. The synchronization device 500 may include a receiver circuit 501, a frequency synchronization circuit 503, a timing synchronization circuit 505, a local system clock $SC_F$ 507 and a free running clock M0 509. The receiver circuit 501, the frequency synchronization circuit 503, the timing synchronization circuit 505, the local system clock $SC_F$ 507 and the free running clock M0 509 may correspond to respective devices 401, 403, 405, 407 and 409 as described above with respect to FIG. 4.

The receiver circuit 501 may be configured to receive data 502a from a first radio network M1 and data 502b from a second radio network M2 based on time-division multiple access. The frequency synchronization circuit 503 may be configured to tune a local system clock 507 to a remote system clock of the first radio network M1 during activity phases of the first radio network M1 and to tune the local system clock 507 to a remote system clock of the second radio network M2 during activity phases of the second radio network M2. The timing synchronization circuit 505 may be configured to time-synchronize data reception 502a from the first radio network M1 based on the local system clock 507 during the activity phases of the first radio network M1 and based on a free running clock 509 during non-activity phases of the first radio network M1. The timing synchronization circuit 505 may be configured to time-synchronize data reception 502b from the second radio network M2 based on the local system clock 507 during the activity phases of the second radio network M2 and based on the free running clock 509 during non-activity phases of the second radio network M2.

The synchronization device 500 may include a first automatic frequency control loop configured to control a reference frequency of the receiver circuit 501 based on data 502a received during the activity phases of the first radio network M1. The synchronization device 500 may include a second automatic frequency control loop configured to control the reference frequency of the receiver circuit 501 based on data 502b received during the activity phases of the second radio network M2. The first automatic frequency control loop and the second automatic frequency control loop may be coupled by the free running clock 509. The synchronization device 500 may further include a compensation circuit, configured to compensate a clock deviation of the free running clock 509 based on an estimate of the local system clock 507 tuned to either the remote system clock of the first radio network M1 or the remote system clock of the second radio network M2.

Figure 6:
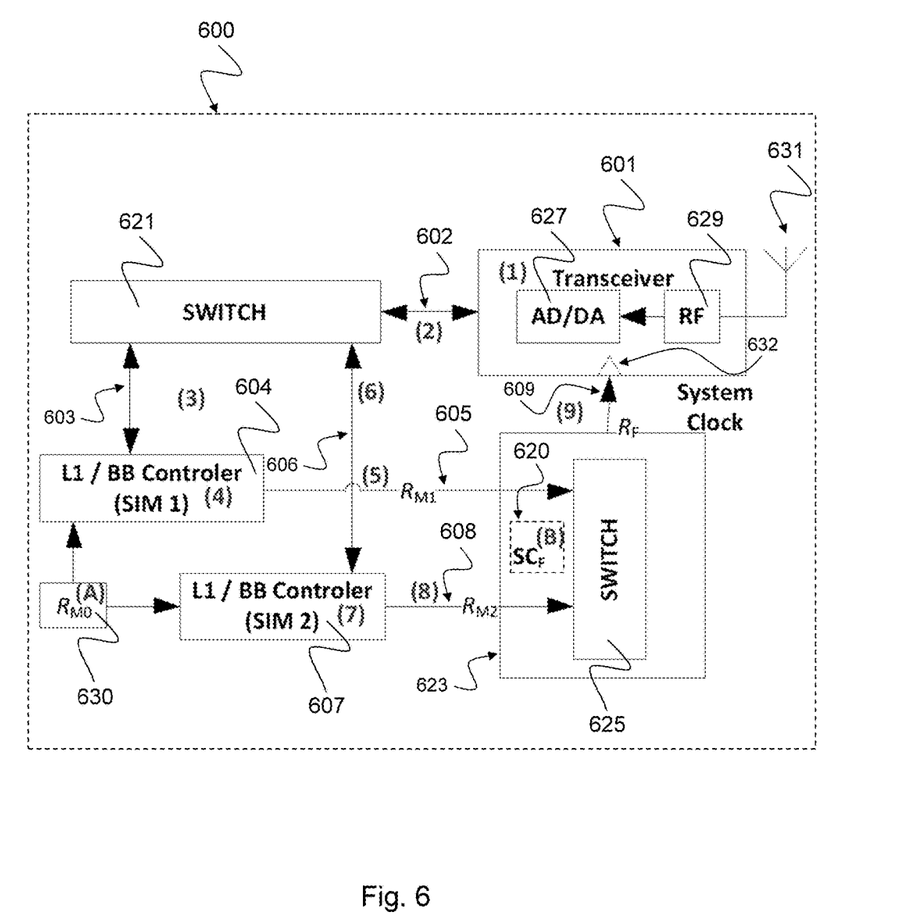
FIG. 6 is a schematic diagram of a synchronization device 600 in accordance with the disclosure.

FIG. 6 is a schematic diagram of a synchronization device 600 in accordance with the disclosure. The synchronization device 600 may include a receiver circuit 601, for example a transceiver circuit, a frequency synchronization circuit 621, 604, 607, a timing synchronization circuit 623, a local system clock $SC_F$ 620 and a free running clock M0 630. The receiver circuit 601, the frequency synchronization circuit 621, 604, 607, the timing synchronization circuit 623, the local system clock $SC_F$ 620 and the free running clock M0 630 may correspond to respective devices 401, 403, 405, 407, 409 and 501, 503, 505, 507, 509 as described above with respect to FIG. 4 and FIG. 5.

The receiver circuit 601 may be configured to receive data via an antenna port 631 from a first radio network M1 during a first time interval A and to receive data from a second radio network M2 during a second time interval B. The frequency synchronization circuit 621, 604, 607 may be configured to control a common system clock $SC_F$ based on (first) data received from the first radio network M1 and based on (second) data received from the second radio network M2. The timing synchronization circuit 623 may be configured to time-synchronize data reception based on the common system clock $SC_F$ 620 and based on a free running clock M0 630. The timing synchronization circuit 623 may be configured to time-synchronize data reception from the first radio network based on the common system clock during the first time interval and based on the free running clock during times not coinciding with the first time interval. The timing synchronization circuit 623 may be configured to time-synchronize data reception from the second radio network based on the common system clock during the second time interval and based on the free running clock during times not coinciding with the second time interval.

The frequency synchronization circuit 621, 604, 607 may be configured to control the common system clock $SC_F$ 620 during the first time interval A based on (first) data received from the first radio network M1 and to control the common system clock $SC_F$ 620 during the second time interval B based on (second) data received from the second radio network M2. The frequency synchronization circuit 621, 604, 607 may be configured to tune the common system clock $SC_F$ 620 to a remote system clock of the first radio network M1 during the first time interval A and to tune the common system clock $SC_F$ to a remote system clock of the second radio network M2 during the second time interval B.

The synchronization device 600 may include a first controller 604 that may be configured to determine a first clock rate $R_{M1}$ associated with the remote system clock of the first radio network M1 based on data received during the first time interval A. The synchronization device 600 may include a second controller 607 that may be configured to determine a second clock rate $R_{M2}$ associated with the remote system clock of the second radio network M2 based on data received during the second time interval B. The synchronization device 600 may include a first switch 621 that may be configured to switch the received data to the first controller 604 during the first time interval A and to switch the received data to the second controller 607 during the second time interval B. The first controller 604 may be coupled to the free running clock M0, 630 and may be configured to determine the first clock rate $R_{M1}$ based on the free running clock M0, 630 during times not coinciding with the first time interval A. The second controller 607 may be coupled to the free running clock M0, 630 and may be configured to determine the second clock rate $R_{M2}$ based on the free running clock M0, 630 during times not coinciding with the second time interval B.

The synchronization device 600 may include a reference circuit 623 that may be configured to adjust the common system clock $SC_F$ based on the first clock rate $R_{M1}$ during the first time interval A and based on the second clock rate $R_{M2}$ during the second time interval B. The reference circuit 623 may include a second switch 625 that may be configured to switch the adjusted common system clock $S_{CF}$ to a reference clock RF input 632 of the receiver circuit 601. The reference circuit 623 may be configured to switch-off the common system clock $SC_F$ during times not coinciding with either one of the first time interval A and the second time interval B.

The synchronization device 600 can be described as a synchronization aperture for Multi-SIM applications as follows. A transceiver 601 is providing the data signals 602 which may be used in a TDMA manner in the L1/BB Controller 604, 607. E.g. the data 603 may be used in the L1/BB Controller (SIM1) 604 to calculate SIM1 specific SC rate 605. This rate may be used to provide reference clock B with clock rate 609 for the transceiver 601. Equivalent but at some other disjunctive time the data 606 may be used in the L1/BB Controller (SIM2) 607 specific AFC loop to calculate SIM2 specific SC rate 608. This rate may be used to provide reference clock B with clock rate 609 for the transceiver 601 at some time interval disjunctive to the time interval for which SIM1 specific SC rate 605 is used. While transmitting the SIM1 specific data 603 SIM1 specific SC rate 605 may be used as SC clock rate. While transmitting the SIM2 specific data 606 SIM2 specific SC rate 608 may be used as SC clock rate. For maintenance of the timing synchronization and for scheduling of the activities a free running clock A with a SIM independent clock rate $R_{M0}$ may be used.

The synchronization device 600 implementing the AFC loop in the TDMA manner provides accurate frequency correction and accurate sampling rate for both SIMs. If only one AFC loop would be used and no additional measures would be taken this would result in a residual frequency offset (for at least one SIM). If two AFC loops are used, but the second AFC loop is using RF PLL to reach frequency synchronization the sampling rate may be incorrect (for the second SIM). If either the frequency or the timing offset is not compensated the receiver sensitivity may be reduced.

The SIM independent free running clock enables the MT to perform accurate SIM specific timing synchronization without the need of additional compensation circuits. Therefore, using the synchronization device 600 decreases the design complexity without additional chip surface, thereby decreasing the device costs. The synchronization device 600 provides better device sensitivity and/or lower costs by equivalent performance as known Multi-SIM solutions.

Figure 7:
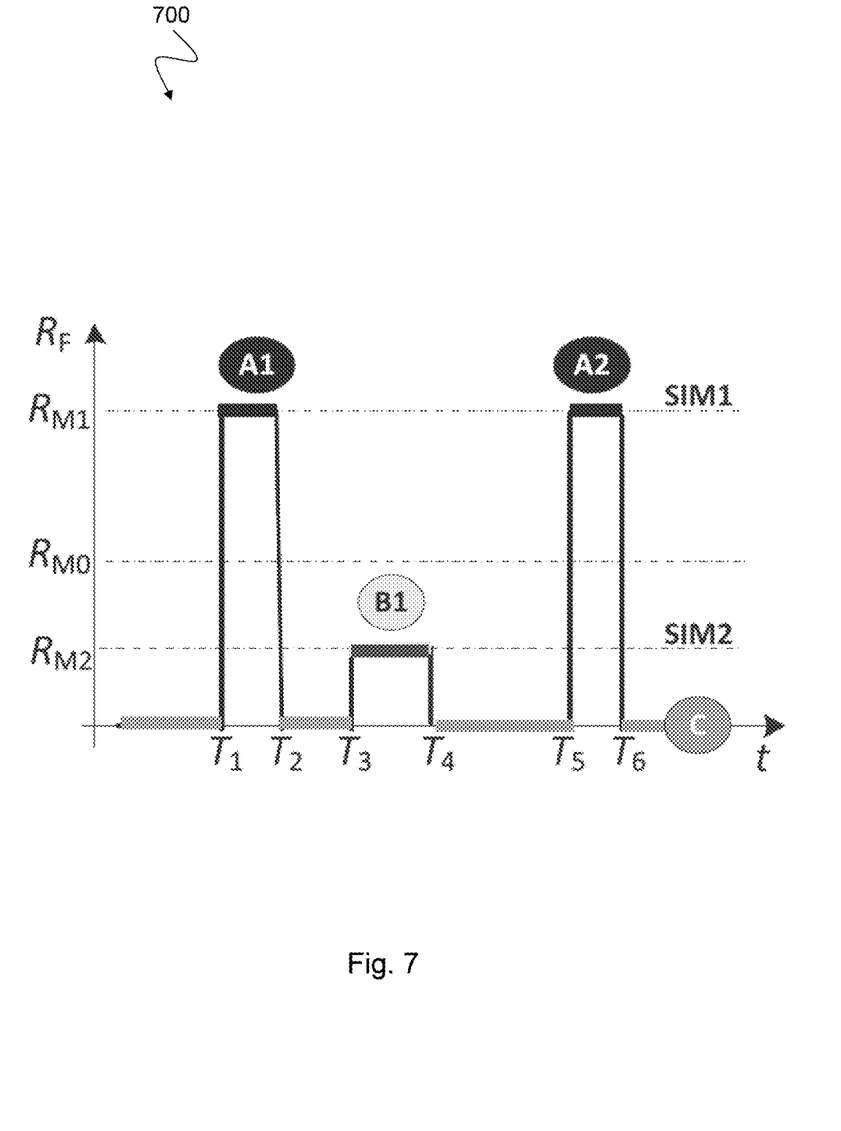
FIG. 7 is a timing diagram 700 of a clock rate used for the frequency synchronization in accordance with the disclosure.

FIG. 7 is a timing diagram 700 of a clock rate used for the frequency synchronization in accordance with the disclosure. The diagram 700 depicts a SIM specific AFC loop implementation. Each SIM maintains its own AFC loop and uses it for setting accurate SIM specific SC rate during the RF activity phases. If none of the SIM requires RF activity frequency synchronization is not needed and $SC_F$ may be switched off. An example on the usage of $SC_F$ is depicted in FIG. 7. The values $T_1$, $T_2$, $T_3$, $T_4$, $T_5$, $T_6$ at the abscissa are representing time t, while the vales $R_{M1}$, $R_{M0}$, $R_{M2}$ at the ordinate are representing the clock rate $R_F$ the MT is using for the frequency synchronization. While MT is receiving the data on the SIM1 (see time intervals A1 and A2) the SC of the MT is set to the rate $R_{M1}$. While MT is receiving the data on the SIM2 (see time interval B1) the SC of the MT is set to the rate $R_{M2}$. If no RF activity is performed on any SIM (see time intervals C) no system clock is required for the frequency synchronization.

The time intervals A1, A2 may correspond to the first time interval 302a, 402a when data is received from the first radio network M1 as described above with respect to FIGS. 3 and 4. The time interval B1 may correspond to the second time interval 302b, 402b when data is received from the second radio network M2 as described above with respect to FIGS. 3 and 4. The time intervals A1, A2 may correspond to the activity phases of the first radio network M1 as described above with respect to FIG. 5. The time interval B1 may correspond to the activity phases of the second radio network M2 as described above with respect to FIG. 5. The time interval C may correspond to the phases when no data is received from both, the first radio network M1 and the second radio network M2 as described above with respect to FIGS. 3, 4 and 5.

Figure 8:
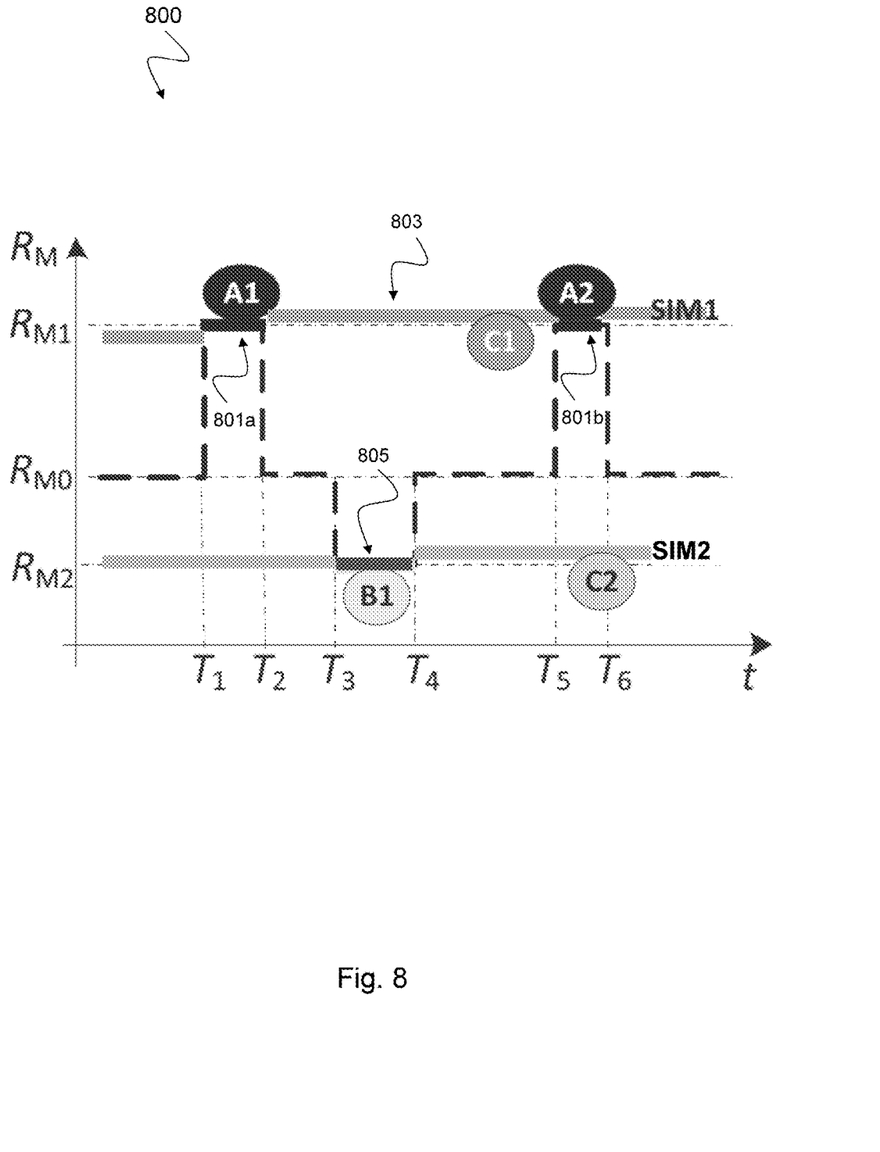
FIG. 8 is a timing diagram 800 of a clock rate used for the timing synchronization in accordance with the disclosure.

FIG. 8 is a timing diagram 800 of a clock rate used for the timing synchronization in accordance with the disclosure. The diagram 800 illustrates the concept for timing synchronization. The values $T_1$, $T_2$, $T_3$, $T_4$, $T_5$, $T_6$ at the abscissa are representing time t, while the vales $R_{M1}$, $R_{M0}$, $R_{M2}$ at the ordinate are representing the clock rates $R_F$ used for the timing synchronization. During SIM1 specific RF activity (see time intervals A1 and A2) an accurate SC with a clock rate $R_{M1}$ is available and may be used for the timing synchronization and activity scheduling 801a, 801b. Since free running clock with the clock rate $R_{M0}$ may always be available and may not be impacted by any other SIM it may be used for the time synchronization of the SIM1 in the phases without RF activity on SIM1. Because the free running clock may be inaccurate but stable, e.g. slow varying, the timing accuracy can be enhanced by an estimate 803 based on the SIM1 specific clock rate $\widetilde{R_{M0,M1}}$:

$$\widetilde{R_{M0,M1}} = E\{R_{M1}, R_{M0}\}. \tag{1}$$

E{ . . . } abbreviates an estimate based on the enclosed parameters. In above equation (1) it is the clock rate of the free running clock $R_{M0}$ and of the SIM1 specific clock rate $R_{M1}$.

In one implementation, the above estimator according to equation (1) may use the SIM1 specific clock as the reference clock and may measure how much tics $N_{M0}^R$ are generated by the free running clock within an observation interval with duration of $t^R = N_{M1}^R / R_{M1}$. $N_{M0}^R$ may then be used to calculate a compensated free running clock rate as:

$$\widetilde{R_{M0,M1}} = \frac{N_{M0}^R}{N_{M1}^R / R_{M1}}. \tag{2}$$

The estimate for the SIM1 specific clock rate $\widetilde{R_{M0,M1}}$ may be used to enhance timing accuracy during the RF inactivity phases of the SIM1. The SIM1 specific time instant for the next activity on the SIM1 may be calculated as $$t_3 = F\{t_2, \widetilde{R_{M0,M1}}, R_{M1}\}, \tag{3}$$

where $t_2$ denotes the current time instant and $t_3$ the SIM1 time instant where the next activity on the SIM1 should be scheduled.

Continuing the above example instead of $R_{M0}$ the clock rate $\widetilde{R_{M0,M1}}$ may be used to calculate $t_3$. If the value $N_2$ of the counter which may be based on the free running clock is corresponding to the time instant $t_2$, then $$N_3 = N_2^0 + (t_3^1 - t_2^0) \widetilde{R_{M0,M1}} \tag{4}$$

corresponds to the time instant $t_3$. If $R_{M0}$ would be accurate, then it would have the same value as $\widetilde{R_{M0,M1}}$.

By analogy SIM2 specific clock rate $R_{M2}$ 805 may be computed as:

$$\widetilde{R_{M0,M2}} = E\{R_{M2}, R_{M0}\}, \tag{5}$$

Figure 9:
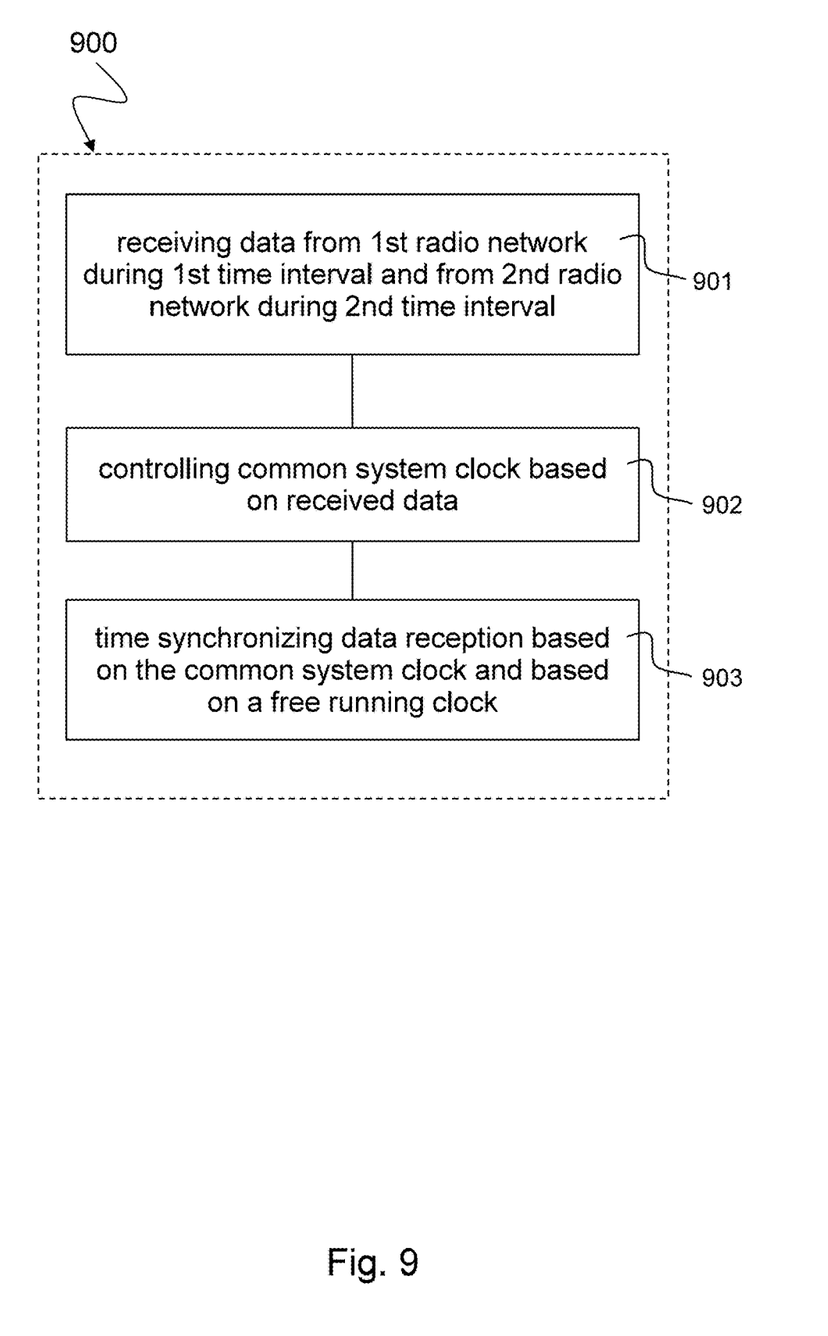
FIG. 9 is a schematic diagram of a method 900 for synchronizing data reception from a first radio network and data reception from a second radio network in accordance with the disclosure.

FIG. 9 is a schematic diagram of a method 900 for synchronizing data reception from a first radio network and data reception from a second radio network in accordance with the disclosure. The method 900 includes receiving 901 data from a first radio network M1 during a first time interval A and from a second radio network M2 during a second time interval B, e.g. as described above with respect to FIGS. 1 to 8. The method 900 includes controlling 902 a common system clock $SC_F$ based on (first) data received from the first radio network M1 and based on (second) data received from the second radio network M2, e.g. as described above with respect to FIGS. 1 to 8. The method 900 includes time-synchronizing 903 data reception based on the common system clock $SC_F$ and based on a free running clock M0, e.g. as described above with respect to FIGS. 1 to 8.

The method 900 may include time-synchronizing 903 data reception from the first radio network based on the common system clock during the first time interval and based on the free running clock during times not coinciding with the first time interval. The method 900 may include time-synchronizing 903 data reception from the second radio network based on the common system clock during the second time interval and based on the free running clock during times not coinciding with the second time interval. The method 900 may include controlling the common system clock $SC_F$ during the first time interval A based on (first) data received from the first radio network M1 and during the second time interval B based on (second) data received from the second radio network M2. The method 900 may include tuning the common system clock $SC_F$ to a remote system clock of the first radio network M1 during the first time interval A and to a remote system clock of the second radio network M2 during the second time interval B.

The method 900 may include determining a first clock rate $R_{M1}$ associated with the remote system clock of the first radio network (M1) based on data received during the first time interval A. The method 900 may include determining a second clock rate $R_{M2}$ associated with the remote system clock of the second radio network M2 based on data received during the second time interval B. The method 900 may include determining the first clock rate $R_{M1}$ based on the free running clock M0 during times not coinciding with the first time interval A. The method 900 may include determining the second clock rate $R_{M2}$ based on the free running clock M0 during times not coinciding with the second time interval B.

The method 900 may include determining the first clock rate $R_{M1}$ during times not coinciding with the first time interval A based on the free running clock M0 and based on the first clock rate $R_{M1}$ determined during the first time interval A. The method 900 may include determining the second clock rate $R_{M2}$ during times not coinciding with the second time interval B based on the free running clock M0 and based on the second clock rate $R_{M2}$ determined during the second time interval B. The method 900 may include using the common system clock $SC_F$ tuned to either the remote system clock of the first radio network M1 or the remote system clock of the second radio network M2 as reference clock. The method 900 may include determining a deviation of the free running clock from the reference clock. The method 900 may include compensating the deviation of the free running clock.

The method 900 may include adjusting the common system clock $SC_F$ based on the first clock rate $R_{M1}$ during the first time interval A and based on the second clock rate $R_{M2}$ during the second time interval B. The method 900 may include switching-off the common system clock $SC_F$ during times not coinciding with either one of the first time interval A or the second time interval B. The first time interval A may be disjunctive to the second time interval B.

The present disclosure also supports a computer program product including computer executable code or computer executable instructions that, when executed, causes at least one computer to execute the performing and computing steps described herein, in particular the method 900 as described above with respect to FIG. 9 and the techniques described above with respect to FIGS. 1 to 8. Such a computer program product may include a readable storage medium storing program code thereon for use by a computer. The program code may perform the method 900 as described above with respect to FIG. 9.

EXAMPLES

The following examples pertain to further embodiments. Example 1 is a synchronization device, comprising: a receiver circuit configured to receive data from a first radio network during a first time interval and to receive data from a second radio network during a second time interval; a frequency synchronization circuit configured to control a common system clock based on first data received from the first radio network and based on second data received from the second radio network; and a timing synchronization circuit configured to time-synchronize data reception based on the common system clock and based on a free running clock.

In Example 2, the subject matter of Example 1 can optionally include that the timing synchronization circuit is configured to: time-synchronize data reception from the first radio network based on the common system clock during the first time interval and based on the free running clock during times separate from the first time interval; and time-synchronize data reception from the second radio network based on the common system clock during the second time interval and based on the free running clock during times separate from the second time interval.

In Example 3, the subject matter of any one of Examples 1-2 can optionally include that the frequency synchronization circuit is configured to control the common system clock during the first time interval based on data received from the first radio network and to control the common system clock during the second time interval based on data received from the second radio network.

In Example 4, the subject matter of Example 3 can optionally include that the frequency synchronization circuit is configured to tune the common system clock to a remote system clock of the first radio network during the first time interval and to tune the common system clock to a remote system clock of the second radio network (M2) during the second time interval.

In Example 5, the subject matter of Example 4 can optionally include a first controller configured to determine a first clock rate associated with the remote system clock of the first radio network based on data received during the first time interval; and a second controller configured to determine a second clock rate associated with the remote system clock of the second radio network based on data received during the second time interval.

In Example 6, the subject matter of Example 5 can optionally include a first switch configured to switch the received data to the first controller during the first time interval and to switch the received data to the second controller during the second time interval.

In Example 7, the subject matter of any one of Examples 5-6 can optionally include that the first controller is coupled to the free running clock and configured to determine the first clock rate based on the free running clock during times separate from the first time interval; and that the second controller is coupled to the free running clock and configured to determine the second clock rate based on the free running clock during times separate from the second time interval.

In Example 8, the subject matter of any one of Examples 5-6 can optionally include a reference circuit configured to adjust the common system clock based on the first clock rate during the first time interval and based on the second clock rate during the second time interval.

In Example 9, the subject matter of Example 8 can optionally include that the reference circuit comprises: a second switch configured to switch the adjusted common system clock to a reference clock input of the receiver circuit.

In Example 10, the subject matter of any one of Examples 8-9 can optionally include that the reference circuit is configured to switch-off the common system clock during times separate from the first time interval or the second time interval.

Example 11 is a method for synchronizing data reception from a first radio network and data reception from a second radio network, the method comprising: receiving data from a first radio network during a first time interval and from a second radio network during a second time interval; controlling a common system clock based on data received from the first radio network and based on data received from the second radio network; and time-synchronizing data reception based on the common system clock and based on a free running clock.

In Example 12, the subject matter of Example 11 can optionally include time-synchronizing data reception from the first radio network based on the common system clock during the first time interval and based on the free running clock during times separate from the first time interval; and time-synchronizing data reception from the second radio network based on the common system clock during the second time interval and based on the free running clock during times separate from the second time interval.

In Example 13, the subject matter of any one of Examples 11-12 can optionally include controlling the common system clock during the first time interval based on data received from the first radio network and during the second time interval based on data received from the second radio network.

In Example 14, the subject matter of Example 13 can optionally include tuning the common system clock to a remote system clock of the first radio network during the first time interval and to a remote system clock of the second radio network during the second time interval.

In Example 15, the subject matter of Example 14 can optionally include determining a first clock rate associated with the remote system clock of the first radio network based on data received during the first time interval; and determining a second clock rate associated with the remote system clock of the second radio network based on data received during the second time interval.

In Example 16, the subject matter of Example 15 can optionally include determining the first clock rate based on the free running clock during times separate from the first time interval; and determining the second clock rate based on the free running clock during times separate from the second time interval.

In Example 17, the subject matter of any one of Examples 15-16 can optionally include determining the first clock rate during times separate from the first time interval based on the free running clock and based on the first clock rate determined during the first time interval; and determining the second clock rate during times separate from the second time interval based on the free running clock and based on the second clock rate determined during the second time interval.

In Example 18, the subject matter of Example 17 can optionally include using the common system clock tuned to either the remote system clock of the first radio network or the remote system clock of the second radio network as reference clock; determining a deviation of the free running clock from the reference clock; and compensating the deviation of the free running clock.

In Example 19, the subject matter of any one of Examples 15-18 can optionally include adjusting the common system clock based on the first clock rate during the first time interval and based on the second clock rate during the second time interval.

In Example 20, the subject matter of any one of Examples 11-19 can optionally include switching-off the common system clock during times separate from the first time interval or the second time interval.

In Example 21, the subject matter of any one of Examples 11-20 can optionally include that the first time interval is disjunctive to the second time interval.

Example 22 is a synchronization device for use in a multi-SIM mobile receiver, comprising: a receiver circuit configured to receive data from a first radio network and data from a second radio network based on time-division multiple access; a frequency synchronization circuit configured to tune a local system clock to a remote system clock of the first radio network during activity phases of the first radio network and to tune the local system clock to a remote system clock of the second radio network during activity phases of the second radio network; and a timing synchronization circuit, configured to: time-synchronize data reception from the first radio network based on the local system clock during the activity phases of the first radio network and based on a free running clock during non-activity phases of the first radio network; and time-synchronize data reception from the second radio network based on the local system clock during the activity phases of the second radio network and based on the free running clock during non-activity phases of the second radio network.

In Example 23, the subject matter of Example 22 can optionally include a first automatic frequency control loop configured to control a reference frequency of the receiver circuit based on data received during the activity phases of the first radio network; and a second automatic frequency control loop configured to control the reference frequency of the receiver circuit based on data received during the activity phases of the second radio network.

In Example 24, the subject matter of Example 23 can optionally include that the first automatic frequency control loop and the second automatic frequency control loop are coupled by the free running clock.

In Example 25, the subject matter of Example 24 can optionally include a compensation circuit, configured to compensate a clock deviation of the free running clock based on an estimate of the local system clock tuned to either the remote system clock of the first radio network or the remote system clock of the second radio network.

Example 26 is a computer readable medium on which computer instructions are stored which when executed by a computer, cause the computer to perform the method of one of Examples 11 to 21.

Example 27 is a synchronization system, comprising: a receiver circuit configured to receive data from a first radio network during a first time interval and to receive data from a second radio network during a second time interval; a frequency synchronization circuit configured to control a common system clock based on data received from the first radio network and based on data received from the second radio network; and a timing synchronization circuit configured to time-synchronize data reception based on the common system clock and based on a free running clock.

In Example 28, the subject matter of Example 27 can optionally include that the timing synchronization circuit is configured to: time-synchronize data reception from the first radio network based on the common system clock during the first time interval and based on the free running clock during times separate from the first time interval; and time-synchronize data reception from the second radio network based on the common system clock during the second time interval and based on the free running clock during times separate from the second time interval.

In Example 29, the subject matter of any one of Examples 27-28 can optionally include that the frequency synchronization circuit is configured to control the common system clock during the first time interval based on data received from the first radio network and to control the common system clock during the second time interval based on data received from the second radio network.

In Example 30, the subject matter of any one of Examples 27-29 can optionally include that the system is an on-chip system.

Example 31 is a synchronization system for use in a multi-SIM mobile receiver, comprising: a receiver circuit configured to receive data from a first radio network and data from a second radio network based on time-division multiple access; a frequency synchronization circuit configured to tune a local system clock to a remote system clock of the first radio network during activity phases of the first radio network and to tune the local system clock to a remote system clock of the second radio network during activity phases of the second radio network; and a timing synchronization circuit, configured to: time-synchronize data reception from the first radio network based on the local system clock during the activity phases of the first radio network and based on a free running clock during non-activity phases of the first radio network; and time-synchronize data reception from the second radio network based on the local system clock during the activity phases of the second radio network and based on the free running clock during non-activity phases of the second radio network.

In Example 32, the subject matter of Example 31 can optionally include a first automatic frequency control loop configured to control a reference frequency of the receiver circuit based on data received during the activity phases of the first radio network; and a second automatic frequency control loop configured to control the reference frequency of the receiver circuit based on data received during the activity phases of the second radio network.

In Example 33, the subject matter of Example 32 can optionally include that the first automatic frequency control loop and the second automatic frequency control loop are coupled by the free running clock.

In Example 34, the subject matter of Example 33 can optionally include a compensation circuit, configured to compensate a clock deviation of the free running clock based on an estimate of the local system clock tuned to either the remote system clock of the first radio network or the remote system clock of the second radio network.

In Example 35, the subject matter of any one of Examples 31-34 can optionally include that the system is an on-chip system.

Example 36 is a device for synchronizing data reception from a first radio network and data reception from a second radio network, the device comprising: means for receiving data from a first radio network during a first time interval and from a second radio network during a second time interval; means for controlling a common system clock based on data received from the first radio network and based on data received from the second radio network; and means for time-synchronizing data reception based on the common system clock and based on a free running clock.

In Example 37, the subject matter of Example 36 can optionally include means for time-synchronizing data reception from the first radio network based on the common system clock during the first time interval and based on the free running clock during times separate from the first time interval; and means for time-synchronizing data reception from the second radio network based on the common system clock during the second time interval and based on the free running clock during times separate from the second time interval.

In Example 38, the subject matter of any one of Examples 36-37 can optionally include means for controlling the common system clock during the first time interval based on data received from the first radio network and during the second time interval based on data received from the second radio network.

In Example 39, the subject matter of Example 36 can optionally include means for tuning the common system clock to a remote system clock of the first radio network during the first time interval and to a remote system clock of the second radio network during the second time interval.

In Example 40, the subject matter of Example 36 can optionally include means for determining a first clock rate associated with the remote system clock of the first radio network based on data received during the first time interval; and means for determining a second clock rate associated with the remote system clock of the second radio network based on data received during the second time interval.

In Example 41, the subject matter of Example 36 can optionally include means for determining the first clock rate based on the free running clock during times separate from the first time interval; and means for determining the second clock rate based on the free running clock during times separate from the second time interval.

In Example 42, the subject matter of Example 36 can optionally include means for determining the first clock rate during times separate from the first time interval based on the free running clock and based on the first clock rate determined during the first time interval; and means for determining the second clock rate during times separate from the second time interval based on the free running clock and based on the second clock rate determined during the second time interval.

In Example 43, the subject matter of Example 36 can optionally include means for using the common system clock tuned to either the remote system clock of the first radio network or the remote system clock of the second radio network as reference clock; means for determining a deviation of the free running clock from the reference clock; and means for compensating the deviation of the free running clock.

In Example 44, the subject matter of Example 40 can optionally include means for adjusting the common system clock based on the first clock rate during the first time interval and based on the second clock rate during the second time interval.

In Example 45, the subject matter of Example 36 can optionally include means for switching-off the common system clock during times separate from the first time interval or the second time interval.

In Example 46, the subject matter of Example 36 can optionally include that the first time interval is disjunctive to the second time interval.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:

1. A synchronization device, comprising:
a receiver circuit configured to receive data from a first radio network during a first time interval and to receive data from a second radio network during a second time interval;
a frequency synchronization circuit configured to:
control a common system clock by tuning the common system clock to a remote system clock of the first radio network during the first time interval based on data received from the first radio network, and tuning the common system clock to a remote system clock of the second radio network during the second time interval based on data received from the second radio network;

determine (i) a first clock rate associated with the remote system clock of the first radio network based on data received during the first time interval, and (ii) a second clock rate associated with the remote system clock of the second radio network based on data received during the second time interval; and a timing synchronization circuit configured to time-synchronize data reception during the first time interval and the second time interval based on (i) the tuned common system clock during the first time interval and the second time interval, respectively, and (ii) a free running clock that runs independently of a subscriber identity module.

2. The synchronization device of claim 1, wherein the timing synchronization circuit is configured to:

time-synchronize data reception from the first radio network based on the common system clock during the first time interval and based on the free running clock during times not coinciding with the first time interval; and time-synchronize data reception from the second radio network based on the common system clock during the second time interval and based on the free running clock during times not coinciding with the second time interval.

3. The synchronization device of claim 1, comprising:

a switch configured to provide the received data from the first radio network to the frequency synchronization circuit during the first time interval, and to provide the received data from the second radio network to the frequency synchronization circuit during the second time interval.

4. The synchronization device of claim 1, wherein the frequency synchronization circuit is coupled to the free running clock and is configured to determine (i) the first clock rate based on the free running clock during times not coinciding with the first time interval, and (ii) the second clock rate based on the free running clock during times not coinciding with the second time interval.

5. The synchronization device of claim 1, wherein the timing synchronization circuit includes a switch configured to provide the common system clock tuned to either the remote system clock of the first radio network or the remote system clock of the second radio network to a reference clock input of the receiver circuit.

6. The synchronization device of claim 1, wherein the timing synchronization circuit is configured to switch-off the common system clock during times not coinciding with either one of the first time interval and the second time interval.

7. A method for synchronizing data reception from a first radio network and data reception from a second radio network, the method comprising:

receiving data from a first radio network during a first time interval and from a second radio network during a second time interval;

controlling a common system clock by tuning the common system clock to a remote system clock of the first radio network during the first time interval based on data received from the first radio network and tuning the common system clock to a remote system clock of the second radio network during the second time interval based on data received from the second radio network;

determining (i) a first clock rate associated with the remote system clock of the first radio network based on data received during the first time interval, and (ii) a second clock rate associated with the remote system clock of the second radio network based on data received during the second time interval; and time-synchronizing data reception during the first time interval and the second time interval based on (i) the tuned common system clock during the first time interval and the second time interval, respectively, and (ii) a free running clock that runs independently of a subscriber identity module.

8. The method of claim 7, comprising:

time-synchronizing data reception from the first radio network based on the common system clock during the first time interval and based on the free running clock during times not coinciding with the first time interval; and time-synchronizing data reception from the second radio network based on the common system clock during the second time interval and based on the free running clock during times not coinciding with the second time interval.

9. The method of claim 7, comprising:

determining the first clock rate based on the free running clock during times not coinciding with the first time interval; and determining the second clock rate based on the free running clock during times not coinciding with the second time interval.

10. The method of claim 7, comprising:

determining the first clock rate during times not coinciding with the first time interval based on the free running clock and based on the first clock rate determined during the first time interval; and determining the second clock rate during times not coinciding with the second time interval based on the free running clock and based on the second clock rate determined during the second time interval.

11. The method of claim 10, comprising:

using the common system clock tuned to either the remote system clock of the first radio network or the remote system clock of the second radio network as a reference clock;

determining a deviation of the free running clock from the reference clock; and compensating the deviation of the free running clock.

12. The method of claim 7, comprising:

adjusting the common system clock based on the first clock rate during the first time interval and based on the second clock rate during the second time interval.

13. The method of claim 7, comprising:

switching-off the common system clock during times not coinciding with either one of the first time interval and the second time interval.

14. The method of claim 7, wherein the first time interval is disjunctive to the second time interval.

* * * * *